(12) United States Patent
O'Sullivan et al.

(10) Patent No.: US 7,212,516 B1
(45) Date of Patent: May 1, 2007

(54) NETWORK SPANNING HETEROGENEOUS CALL CENTER AND METHOD OF OPERATION

(75) Inventors: Marcus O'Sullivan, Cupertino, CA (US); Michael Frawley, Clare (IR)

(73) Assignee: Nortel Networks Limited, St. Laurent, Quebec (CA)

( * ) Notice: Subject to any disclaimer, the term of this patent is extended or adjusted under 35 U.S.C. 154(b) by 852 days.

(21) Appl. No.: 09/748,069

(22) Filed: Dec. 22, 2000

(51) Int. Cl.
*H04L 12/50* (2006.01)
*H04J 3/16* (2006.01)
*H04J 3/22* (2006.01)

(52) U.S. Cl. .................................. 370/352; 370/465
(58) Field of Classification Search ............... 370/352, 370/353, 401
See application file for complete search history.

(56) References Cited

U.S. PATENT DOCUMENTS

| | | | | |
|---|---|---|---|---|
| 5,848,143 A * | 12/1998 | Andrews et al. | ........ | 379/265.09 |
| 5,862,211 A * | 1/1999 | Roush | ........................ | 379/309 |
| 5,978,467 A * | 11/1999 | Walker et al. | .......... | 379/266.01 |
| 6,046,762 A * | 4/2000 | Sonesh et al. | ............ | 348/14.11 |
| 6,049,779 A * | 4/2000 | Berkson | ........................ | 705/14 |
| 6,064,667 A * | 5/2000 | Gisby et al. | ................ | 370/352 |
| 6,115,462 A * | 9/2000 | Servi et al. | ............. | 379/221.06 |
| 6,122,364 A * | 9/2000 | Petrunka et al. | ........ | 379/265.02 |
| 6,324,276 B1 * | 11/2001 | Uppaluru et al. | ...... | 379/220.01 |
| 6,389,005 B1 * | 5/2002 | Cruickshank | ................ | 370/351 |
| 6,389,007 B1 * | 5/2002 | Shenkman et al. | ......... | 370/352 |
| 6,438,599 B1 * | 8/2002 | Chack | ........................ | 709/229 |
| 6,526,041 B1 * | 2/2003 | Shaffer et al. | ............... | 370/352 |
| 6,539,077 B1 * | 3/2003 | Ranalli et al. | .............. | 379/67.1 |
| 6,549,539 B1 * | 4/2003 | Neyman | ...................... | 370/401 |
| 6,584,094 B2 * | 6/2003 | Maroulis et al. | ............. | 370/352 |
| 6,584,191 B1 * | 6/2003 | McPartlan et al. | ...... | 379/265.02 |
| 6,611,590 B1 * | 8/2003 | Lu et al. | ................. | 379/265.09 |
| 6,654,458 B1 * | 11/2003 | Saleh | ..................... | 379/265.03 |
| 6,665,395 B1 * | 12/2003 | Busey et al. | ............ | 379/265.09 |
| 6,744,878 B1 * | 6/2004 | Komissarchik et al. | | 379/265.03 |
| 6,744,879 B1 * | 6/2004 | Dezonno | ................ | 379/265.05 |

* cited by examiner

*Primary Examiner*—Huy D. Vu
*Assistant Examiner*—Daniel Ryman
(74) *Attorney, Agent, or Firm*—Garlick Harrison & Markison; Bruce Garlick; Kevin L. Smith

(57) ABSTRACT

A network spanning heterogeneous call center system and method of operation is disclosed. A particular illustrative system is for use with a circuit-switched private branch exchange and a packet-switched private branch exchange. This system includes a circuit-switched private branch exchange interface, a packet-switched private branch exchange interface, and a processor. The circuit-switched private branch exchange interface is to communicate with the circuit-switched private branch exchange, and the packet-switched private branch exchange interface is to communicate with the packet-switched private branch exchange. The processor is coupled to the circuit-switched private branch exchange interface and to the packet-switched private branch exchange interface. A particular illustrative method of operation includes receiving a circuit-switched call event from a circuit-switched private branch exchange, receiving an internet protocol call event from a packet-switched private branch exchange, and processing the circuit-switched call event and the internet protocol call event using a call controller.

12 Claims, 6 Drawing Sheets

NETWORK SPANNING HETEROGENEOUS CALL CENTER AND METHOD OF OPERATION

BACKGROUND

1. Technical Field

The present invention relates generally to call centers; and more particularly to a call center that supports both circuit-switched and internet protocol traffic.

2. Related Art

Call centers are generally known to receive telephone calls from callers and to route the calls to particular operators that will respond to various caller requests and inquiries. Call centers typically operate in a circuit-switched environment and are coupled to the Public Switched Telephone Network (PSTN). Companies that sell products absolutely require call centers to both sell the products and provide service for the products after the sale is made. Call centers, however, are expensive to acquire and difficult to operate. In order to minimize the cost of the call centers, companies typically seek solutions that will minimize call center traffic. However, at the same time, because product support will oftentimes secure an initial sale, the call centers and other product support mechanisms must fully satisfy customers' support requirements.

In order to reduce some of the call center traffic, other unmanned computer equipment is deployed. This computer equipment couples to the Internet (internet protocol infrastructure that and is typically accessible via the World Wide Web). The IP based computer equipment supports web pages and email traffic and augments the services provided by the call centers. Successful IP based computer equipment that provides product support will off-load some, or a large portion of the call center traffic. Web pages serviced by the IP based computer equipment web typically include applications that direct users via a menu structure to answers to their produce support questions. Further, the IP based computer equipment allows customers to ask questions using email. The email further off-loads the call centers and allows service personnel to answer the email based questions when time permits.

Unfortunately, the IP based computer equipment is separate from the call center equipment and the network to which the IP based computer equipment connects (i.e., the Internet) is separate from the PSTN network that couples to the circuit-switched call center. Resultantly, the circuit-switched call center and the IP based computer equipment are different entities. Costs of redundancy are thereby incurred in deploying and managing both the circuit-switched call center and the IP based computer equipment.

As communication technology advances, it will become desirable to service some IP based voice traffic in addition to the circuit-switched voice traffic. However, because all voice traffic is serviced via the circuit switched telephone network in prior systems, such a need is wholly unsatisfied by the prior art systems.

Thus, there is a need for a call center that overcomes these difficulties as well as other difficulties unaddressed by prior call centers.

SUMMARY OF THE INVENTION

Thus, to overcome the shortcomings of the prior systems, among other shortcomings, a network spanning heterogeneous call center services communications received from both the Public Switched Telephone Network (PSTN) and a coupled internet protocol (IP) network, e.g., the Internet. A particular illustrative system includes a PSTN private branch exchange (PSTN PBX), an IP private branch exchange (IP PBX), and a network spanning heterogeneous call center controller. The network spanning heterogeneous call center controller includes a PSTN PBX interface, an IP PBX interface, a processor, and memory. The PSTN PBX interface allows the network spanning heterogeneous call center controller to communicate with the PSTN PBX, and the IP PBX interface allows the network spanning heterogeneous call center controller to communicate with the IP PBX. The processor and memory are coupled to the PSTN PBX interface and to the IP PBX interface and control their operation.

A plurality of locally coupled agent telephone units couple to the PSTN PBX. Further, a plurality of internet enabled agent terminals coupled to the IP PBX. Agent terminals also couple to the PSTN and to the IP network. In particular illustrative operations, the network spanning heterogeneous call center controller receives PSTN call events from the PSTN PBX, receives IP network call events from the IP PBX, and processes the PSTN call events and the IP network call events to service both types of call. In one operation, the network spanning heterogeneous call center controller operates to direct PSTN calls to agent terminals that support PSTN calls and that locally couple to the PSTN PBX or that couple to the PSTN PBX via the PSTN. In another operation, the network spanning heterogeneous call center controller operates to direct voice over IP (VOIP) calls to agent terminals that support VOIP calls and that locally couple to the IP PBX or that couple to the IP PBX via the IP network. These types of terminals are also referred to herein interchangeably as "internet enabled agent terminals."

According to another aspect of the present invention, the network spanning heterogeneous call center couples directly to both the PSTN network and to the IP network. The network spanning heterogeneous call center includes a PSTN interface (time switch) and an IP network interface. The network spanning heterogeneous call center further includes a domain conversion module that converts messages and voice traffic between the circuit-switched PSTN domain and the packet-switched IP network domain. With this structure, the network spanning heterogeneous call center may direct service callers on an inter-domain basis. Further, the network spanning heterogeneous call center may apply its telephone and data resources within either domain. Resultantly, significant savings in both deployment and operation are realized.

According to still another aspect of the present invention, a PSTN PBX, the network spanning heterogeneous call center controller, and a IP PBX couple to a network that supports both IP enabled and conventional voice terminals. Controlled by the network spanning heterogeneous call center controller, the network supports resource sharing between the PSTN PBX and the IP PBX for call servicing operations.

Moreover, other aspects of the present invention will become apparent with further reference to the drawings and specification, which follow.

BRIEF DESCRIPTION OF THE DRAWINGS

A better understanding of the present invention can be obtained when the following detailed description is considered in conjunction with the following drawings, in which.

DETAILED DESCRIPTION OF THE DRAWINGS

Figure 1:
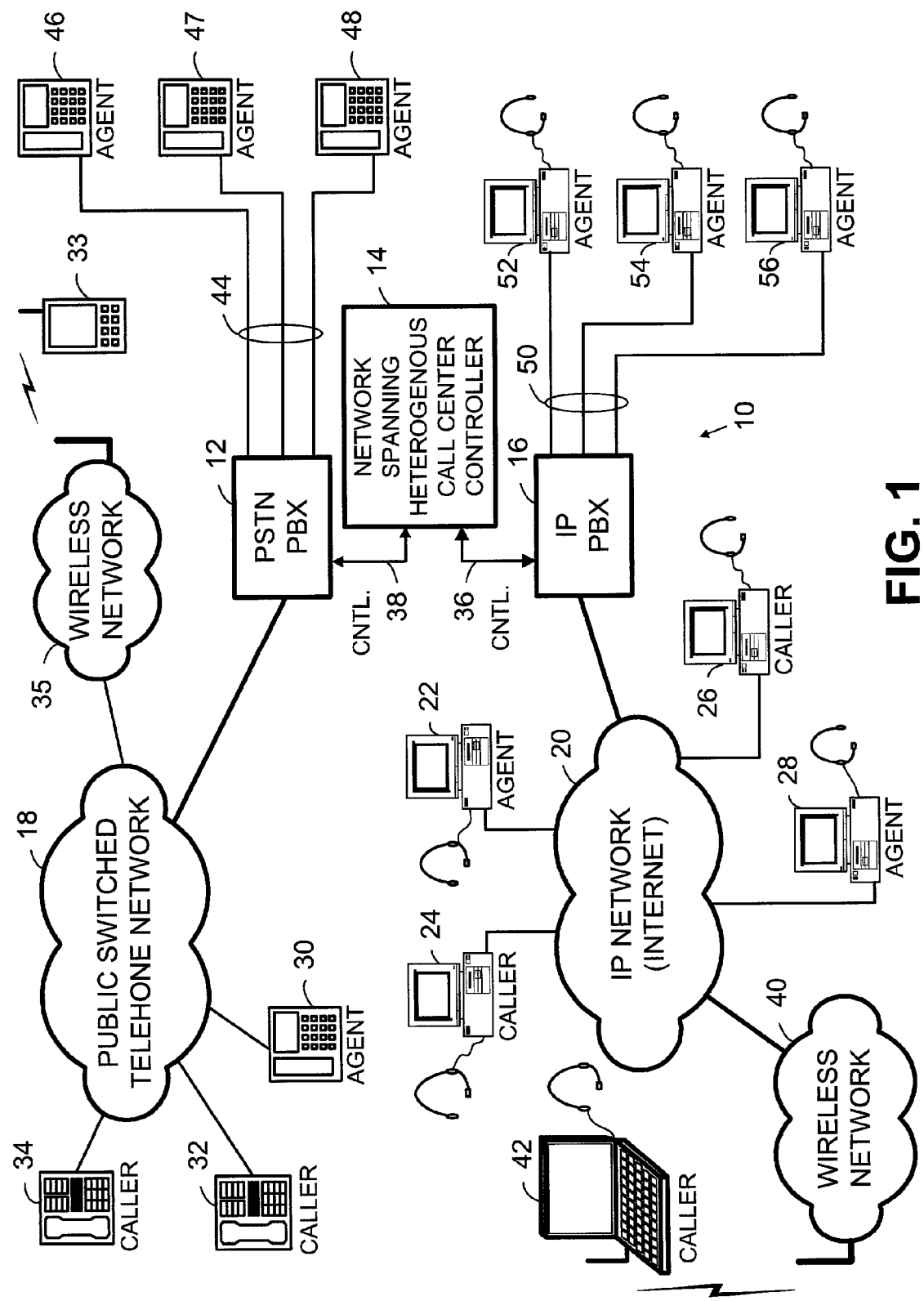
FIG. 1 is a system diagram illustrating a call center constructed according to the present invention that supports call center operations for both circuit switched and packet switched network and terminal connections.

FIG. 1 is a system diagram illustrating a network spanning heterogeneous call center 10 that supports call center operations for both circuit switched and packet switched network and terminal connections. The network spanning heterogeneous call center 10 includes a public switched telephone network private branch exchange (PSTN PBX) 12, a network spanning heterogeneous call center controller 14, and an internet protocol based PBX (IP PBX) 16. The network spanning heterogeneous call center 10 couples to the Public Switched Telephone Network (PSTN) 18, an internet protocol (IP) network 20, and to a plurality of agent terminals. The IP network 20 includes at least one packet switched network and, in the illustrated embodiment, includes the Internet. The IP network 20 may also include intranets and other packet switched networks that support the IP protocol or another packet-switched protocol suite. The PSTN 18 is connected to various telecommunications devices, such as end user voice units (e.g. telephones) 32 and 34, a wireless network 35, a wireless subscriber unit 33, and an agent terminal 30. The agent terminal 30 may be used to provide services to end users, such as users that call from the end user voice units 32 and 34.

The IP network 20 is a distributed computer network that communicates using a data packet based protocol, such as TCP/IP, to various data devices. Available data devices include for example, callers using a personal computer with voice over internet protocol (VOIP) capability 24, 26, IP enabled agent terminals 22, 28, and a wireless subscriber device 42 that couples to the IP network 20 via a coupled wireless network 40.

The PSTN PBX 12 is connected via output communication links 44 to various agent devices that receive voice traffic. These various agent devices include telephone units 46, 47, and 48. The PSTN PBX 12 has the capability of routing voice traffic from the PSTN 18 to the locally coupled agent telephone units 46, 47, and 48 and also to the agent device 30 and others like it that couple to the PSTN PBX 12 via the PSTN 18.

The IP PBX 16 is connected via output communication links 50 to various IP enabled agent terminals 52, 54, and 56. The IP PBX 16 has the capability of routing voice and data traffic received from the IP network 20 to the various IP enabled agent terminals 52, 54, and 56 and to IP enabled agent terminals 22 and 28 coupled to the Internet 20.

The network spanning heterogeneous call center controller 14 is coupled to the PSTN PBX 12 via a first control path 38 and is coupled to the IP PBX 16 via a second control path 36. The network spanning heterogeneous call controller 14 performs many functions relating to managing, monitoring, and controlling the PSTN PBX 12 and the IP PBX 16. These functions will be described further with particular reference to FIGS. 2–4.

Figure 2:
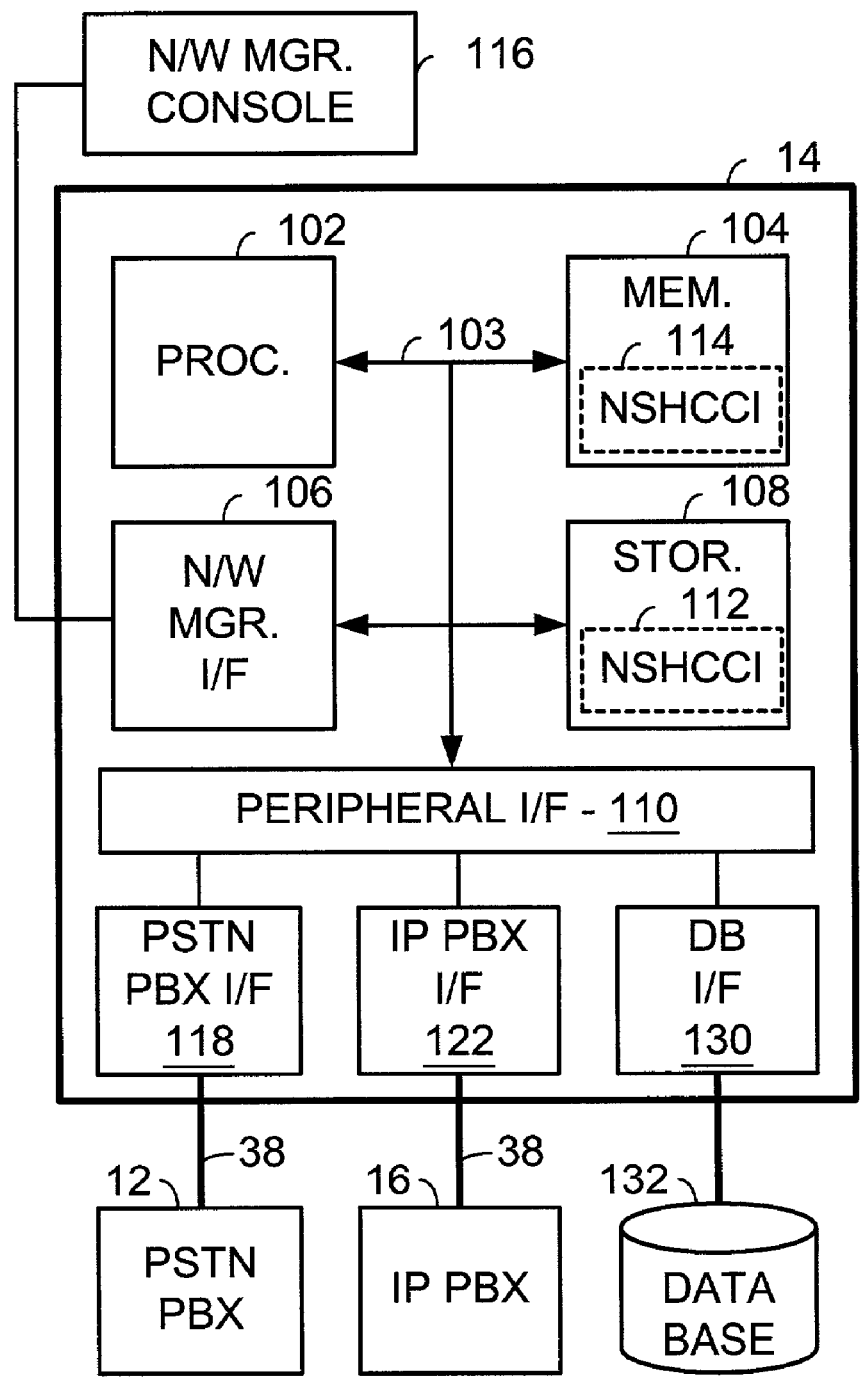
FIG. 2 is a block diagram illustrating the construction of a network spanning heterogeneous call center controller as illustrated in FIG. 1.

FIG. 2 is a block diagram illustrating the construction of a network spanning heterogeneous call center controller 14 according to the present invention. The network spanning heterogeneous call center controller 14 is coupled to the PSTN PBX 12 via the control channel 38 and to the IP PBX 16 via the control channel 36. The control channels 36 and 38 may be network connections such as Ethernet connections, other high-speed connections such as T1 circuits, or other connections capable of supporting the communication requirements there between. The network spanning heterogeneous call center controller 14 is also connected to a network management console terminal 116 with which a network manager interfaces to the network spanning heterogeneous call center controller 14.

The network spanning heterogeneous call center controller 14 includes a network management interface 106 (which couples to the network manager console 116), a peripheral interface 110, a processor 102, a memory 104, and storage 108. These devices intercouple via a processor bus 103. The processor 102 may be a microprocessor, an Application Specific Integrated Circuit, or other digital circuitry that is capable of loading and executing software instructions. The memory 104 may include RAM, ROM, Flash memory, or other memory capable of storing software instructions and data and interfacing with the processor 102 so that the processor 102 may execute such software instructions to process data and to control the components of the PSTN PBX 12. The storage 108 may be magnetic stored, e.g., disk drive, tape drive, etc., may be an optical drive, or may be another type of storage device.

The peripheral interface 110 couples to the processor bus 103 and to a PSTN PBX interface 118, an IP PBX interface 122, and an external database interface 130. The PSTN PBX interface 118 couples to the PSTN PBX 12. The IP PBX interface 122 couples to the IP PBX 16. The database interface 130 couples to an external database 132. The external database 132 stores data that is used by the network spanning heterogeneous call center controller 14 in its operations and other required information/data/software.

The memory 104 and the storage 112, each store Network Spanning Heterogeneous Call Center Instructions (NSH-CCI) 114 and 112, respectively. The NSHCCI 112 are retrieved from the storage 108, placed in memory as NSH-CCI 114 and then retrieved and executed by the processor 102. Upon execution of particular NSHCCI 114 instructions, the processor may send certain command messages to the PSTN PBX 12 and/or to the IP PBX 16. Such message are communicated using the peripheral interface 110 and the PSTN PBX interface 118, via the control channel 38, or the IP PBX interface 122, via the control channel 36. The instruction set includes various telephony commands, such as commands to place calls on hold, to route calls to particular agent terminals, and to provide music on hold, for example. The instruction set also includes various IP based commands, such as commands to provide various data resources, such as email and multimedia content, commands to process email messages, and commands to route VOIP calls. The particular type of commands available depends upon the particular interface employed (i.e. whether using the PSTN PBX interface 118 or the IP PBX interface 122).

In addition to providing commands by executing instructions, the network spanning heterogeneous call center controller 14 also receives and monitors circuit-switched voice and VOIP call traffic. For example, a communication event may be forwarded from either the PSTN PBX 12 or the IP PBX 16 to the network spanning heterogeneous call center controller 14. Upon receipt of such communication event, the processor performs logic operations to determine a programmed response and executes a desired instruction, resulting in application of a command to the appropriate PBX communication event originator.

The network management call center provides a call monitoring and management function. Network management personnel will use the network management console 116 to monitor traffic placed over the PSTN PBX 12 and the IP PBX 16, and to generate various traffic and management reports. The combined monitoring capability of different PBX types is advantageous, since a single operator of the network management console 116 can monitor and control operations of two different types of PBX traffic. Many prior systems require the use of separate network management terminals, and personnel, at least one for the PSTN PBX and a separate terminal/center for the IP PBX. Thus, the combined network management of multiple networks offered by the network spanning controller provides cost savings and management user convenience.

Figure 3:
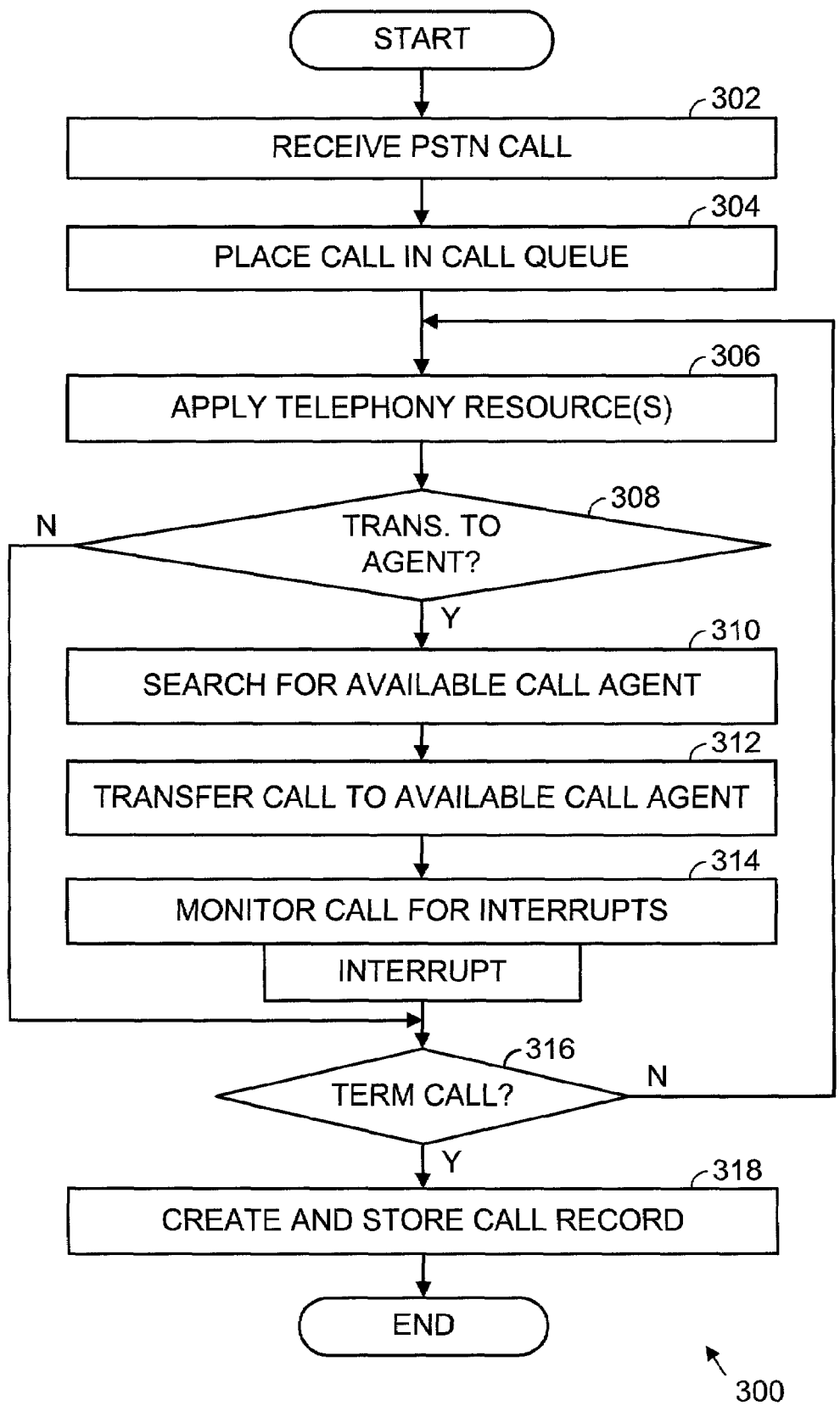
FIG. 3 is a logic diagram illustrating operation of the network spanning heterogeneous call center of FIG. 1 in servicing calls received from a coupled circuit switched network.

FIG. 3 is a logic diagram illustrating operation 300 of the network spanning heterogeneous call center controller 14 in servicing calls received from a coupled circuit switched network. A PSTN call is received by the network management call center, at 302. The call is then placed into a call queue, at 304. Selected telephony resources are optional applied to the call. For example, music on hold treatment may be applied so that the call originator can listen to music while waiting for an available agent to provide service. Other resources include an IVR menu selection feature where the user is prompted to categorize his or her service request. The user input is retrieved and may be used to select a particular agent terminal or to automatically provide a particular service. From 308, if the desired call services have been provided, then the call center operation terminates.

If further servicing is needed via an operator, as determined at 308, processing continues at 310, where a search for an available agent terminal is performed. Once an available agent terminal is determined, the call is transferred to such agent terminal, at 312. The call is then optionally monitored at 314. Upon completion of the call, an interrupt is received and a determination is made as to whether to terminate the call, at 316. If termination is not required, operation proceeds again to 306 where a telephony resource is applied to the call. If not, a call record is created for the call and then stored, at 318. Call center processing is then completed for the particular call.

Figure 4:
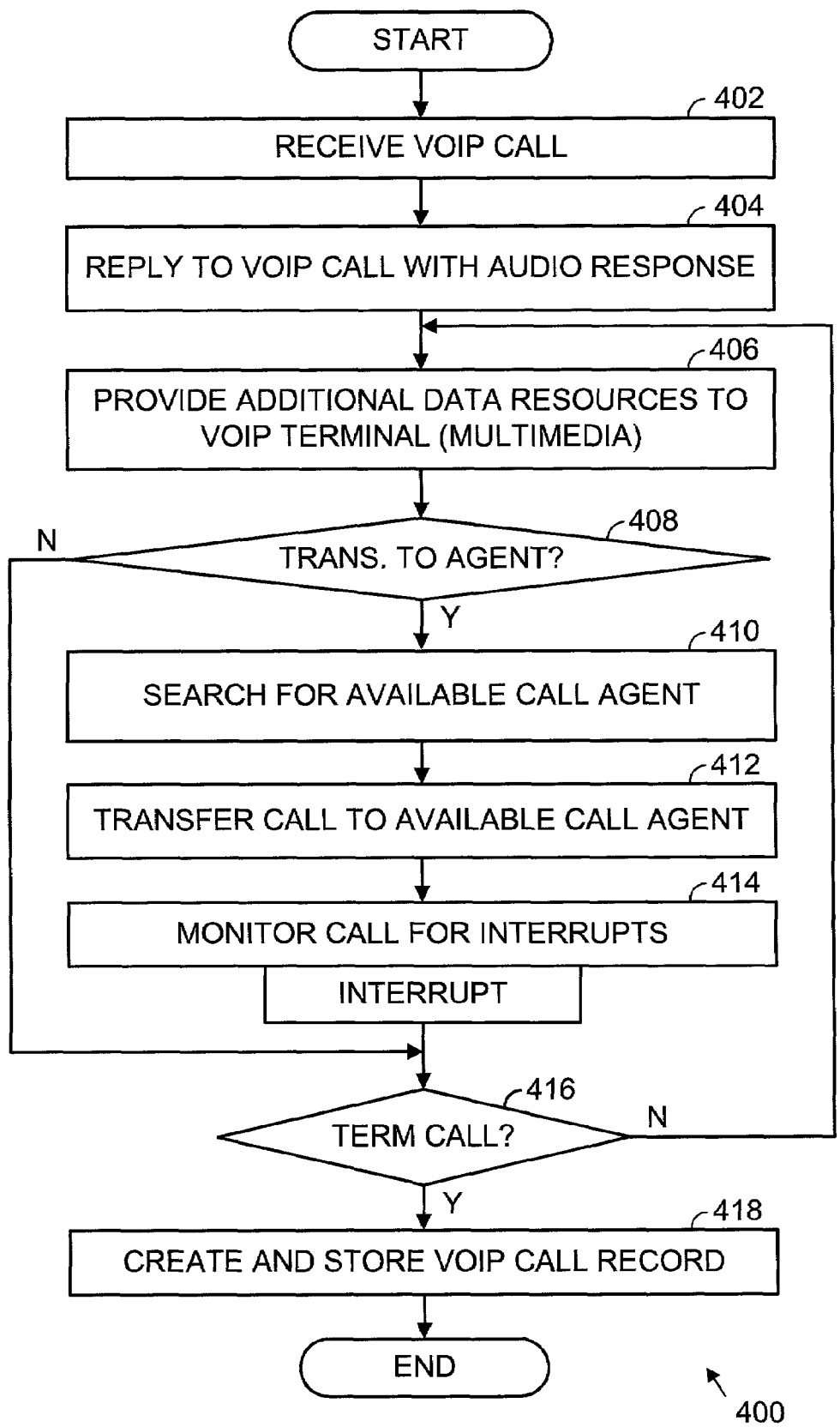
FIG. 4 is a logic diagram illustrating operation of the network spanning heterogeneous call center of FIG. 1 in servicing communications received from a coupled packet switched network.

FIG. 4 is a logic diagram illustrating operation 400 of the network spanning heterogeneous call center controller 14 in servicing communications received from a coupled IP network 20. The network spanning heterogeneous call center controller 14 receives a voice over IP (VOIP) call, at step 402. Based on the particular call type and particular request, a selected instruction for providing a particular data service is executed, at 404 that produces an audio response to the VOIP call. The audio response is a greeting that indicates to the caller that the VOIP is in process. Then, additional data resources are sent to the VOIP terminal, at 406. The additional data resources include visual content that is displayed upon a display of the VOIP terminal, should one exist. Such data resources may include a customized interface that will be used for subsequent call processing for the caller. For example, the caller may use the content to interact with the network spanning heterogeneous call center controller 14 prior to any routing of the VOIP call.

Based upon an interaction with the caller via either an audio exchange, e.g., IVR and or interactive voice response operations, the network spanning heterogeneous call center controller 14 determines whether to transfer the call to an agent, at 408. If the call is to be delivered to an agent, the network spanning heterogeneous call center controller 14 searches for an available agent, at 410. A particular agent that communicates via a VOIP enabled agent terminal is then selected, and the VOIP call is transferred to the selected agent terminal, at 412. The VOIP call is then monitored for interrupts, at 414.

When an interrupt occurs, or from 408 if the call is not transferred to an agent, the network spanning heterogeneous call center controller 14 determines whether to terminate the call, at 416. If the VOIP call is not to be terminated, operated, operation returns to 406. If the call is to be terminated, a call record for the call is created and stored, at 418. Then, operation for the particular VOIP call ends.

Figure 5:
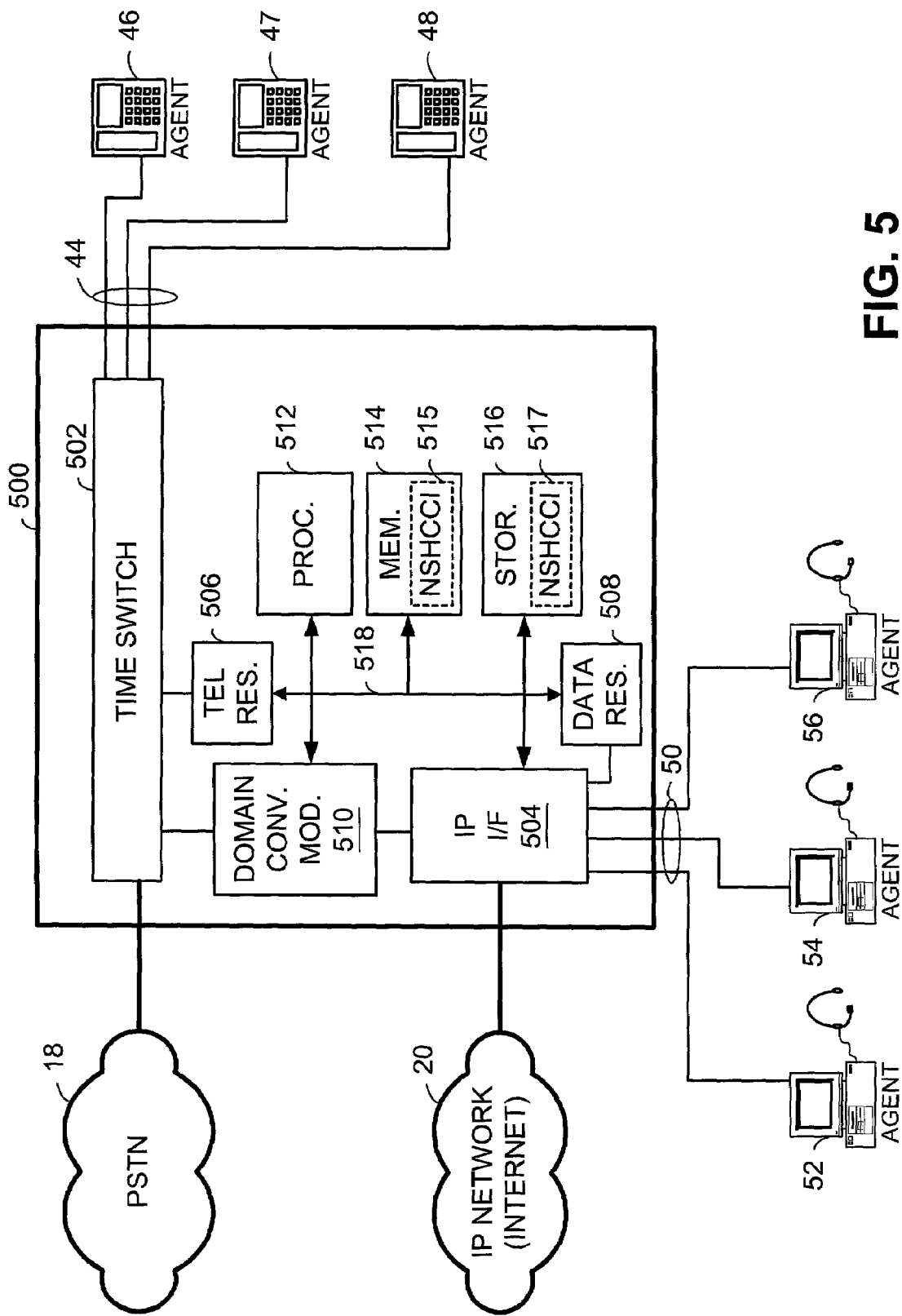
FIG. 5 is a system diagram illustrating another embodiment of a network spanning heterogeneous call center.

FIG. 5 is a system diagram illustrating another embodiment of a network spanning heterogeneous call center 500 constructed according to the present invention. The network spanning heterogeneous call center 500 includes a time switch unit 502 that couples to the PSTN 18 and an IP interface 504 that couples to the IP network 20. The IP interface 504 also couples to IP enabled agent terminals 52, 54, and 56 via communication channels 50. The time switch unit 502 is coupled to various agent attended telephone units 46, 47, and 48 via communication links 44.

The network spanning heterogeneous call center 500 further includes telephony resource module 506, data resource module 508, and a domain conversion module 510. The telephony resource module 506 is coupled to the time switch 502, and the data resource module 508 is coupled to the IP interface 504. The telephony resource module 506 provides such telephony resources as music-on-hold, voice mail, IVR, and speech recognition functions for menu selection, and additional telephony resources, some of which were described above with reference to FIG. 3. Information collected by the telephony resource module 510 is used in routing calls to appropriate agents.

The data resource module 508 provides a wide variety of data functions. Examples of these data functions include web page support, caller interface generation, email services, and other functions, some of which were described above with reference to FIG. 4.

The domain conversion module 510 couples to both the IP interface 504 and to the time switch unit 502. The domain conversion module 510 converts IP messages and VOIP traffic received from by the IP interface 504 into circuit-switched messages and traffic that may be processed and routed by the time switch module 502. Further, the domain conversion module 510 converts circuit-switched messages and traffic received from the time switch module 502 into IP messages and VOIP traffic and provides such to the IP interface 504 for further routing to callers and agents. With these operations, in place, both circuit-switched agent terminals 46, 47, and 48 and VOIP enabled agent terminals 52, 54, and 56 may service PSTN callers. Further, both the circuit-switched agent terminals 46, 47, and 48 and the VOIP enabled agent terminals 52, 54, and 56 may service IP network callers. Moreover, both the telephone resource module 506 and the data resource module 508 may service both PSTN callers and IP callers. These benefits significantly reduce both the costs of deploying a call center and operating a call center.

The network spanning heterogeneous call center 500 also includes a microprocessor 512, memory 514, and a hard drive or other longer-term storage device 516. Network Spanning Heterogeneous Call Center Instructions (NSHCCI) 517 reside in the storage device 516 and are downloaded to memory 514 as NSHCCI 515 for execution by the processor 512. When executing these software instructions, the call center 500 receives and routes voice traffic, such as a PSTN voice call from the PSTN 18, and data traffic, such as VOIP traffic, via the IP network 20. The traffic may be selectively routed to either a VOIP enabled agent terminal 52, 54, or 56, or a traditional PSTN type of agent terminal 46, 47, or 48. In addition, with this embodiment, the call center 500 may route VOIP traffic, through the IP interface 504, domain conversion module 510, and the time switch 502, to a traditional call center terminal 46, 47, or 48. The added flexibility of being able to route either PSTN or VOIP calls to various terminal agent types is commercially advantageous in certain applications, such as priority traffic routing and load balancing.

The operation of the network spanning call center 500 is similar to the operations described with respect to FIGS. 2–4. One important difference is that the PBX type of operations are integrated within the call center 500, thereby removing the need for the control channels, such as control channels 36 and 38, and other redundant PBX functions.

Figure 6:
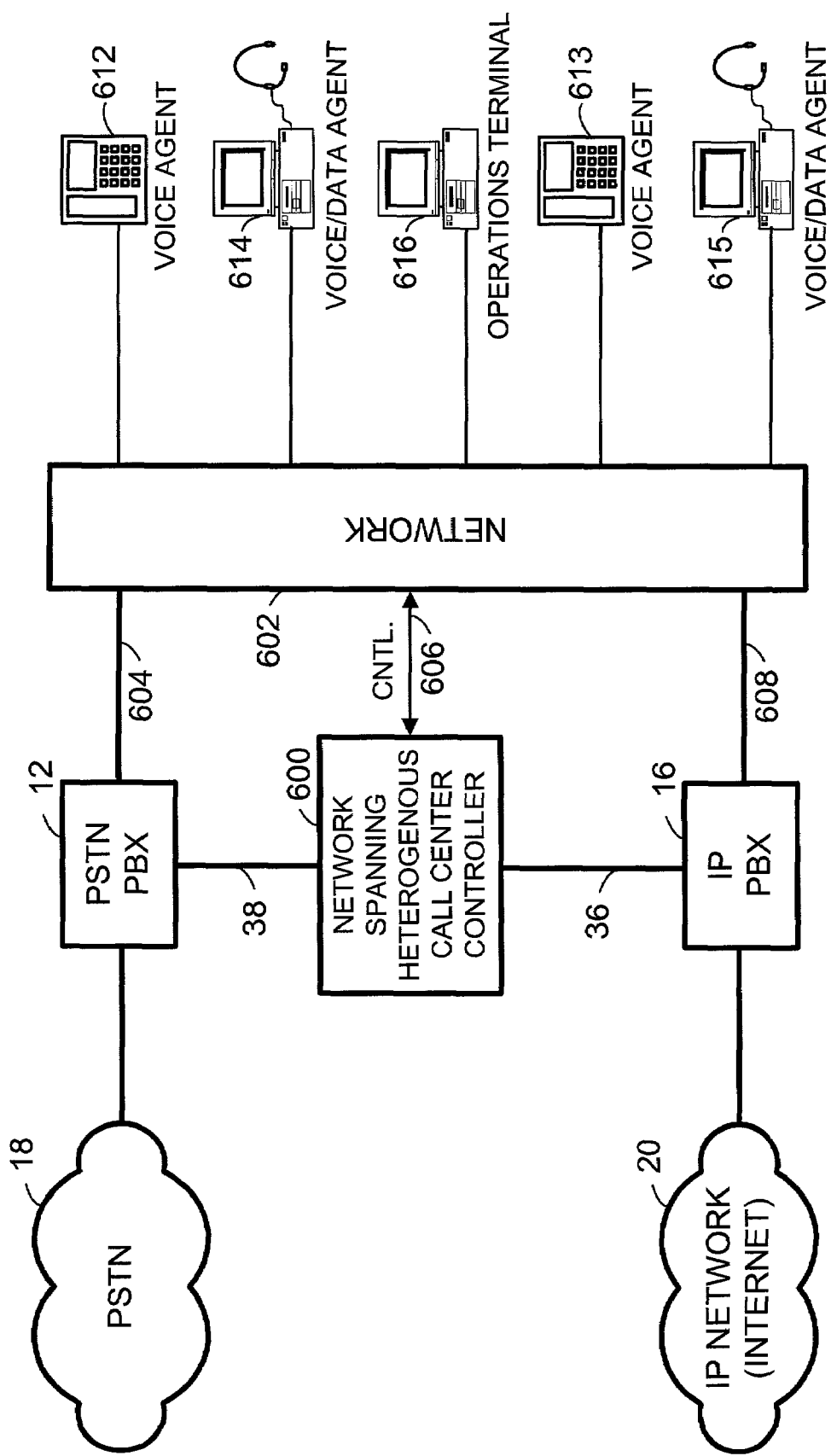
FIG. 6 is a system diagram illustrating still another embodiment of a network spanning heterogeneous call center.

FIG. 6 is a system diagram illustrating still another embodiment of a network spanning heterogeneous call center constructed according to the present invention. The system includes the PSTN 18, the IP network 20, the PSTN PBX 12, the IP PBX 16, a network spanning heterogeneous call center controller 600, and network 602. The network spanning heterogeneous call center controller 600 is coupled to the PSTN PBX 12 via control lines 38 and to IP PBX 16 via control lines 36. The network spanning heterogeneous call controller 600 is connected to the network 602 via control path 606. The network 602 is coupled to the PSTN PBX 12 via voice channel 604. The network 602 is coupled to the IP PBX 16 via the combined voice and data channel 608. The network 602 is connected at its outputs to various terminal types, including voice agent terminals 612 and 613, data/voice agent terminals 614 and 615, and an operations terminal 616.

During operation, the network 602 routes voice traffic from the PSTN PBX 12 to selected terminals, in some cases based upon commands issued from the network spanning call center controller 600. In other cases, the network 602 provides hard-wired paths between the PSTN PBX 12 and the voice agent terminals 612 and 613. In addition, the network 602 also routes voice and data between the IP PBX 16 and the voice/data agent terminals 614 and 615. In some operations, the network spanning call center controller 600 controls the network 602 to perform these routing operations. In other operations, the network 602 simply provides hard-wired connections that support routing of voice and data by the IP PBX 16. The network 602 also supports a communication path between the network spanning call center controller 606 and an operations terminal 616.

Thus, in one embodiment, the network 602 is a hard-wired network that supports both circuit-switched and packet-switched communications. However, in another embodiment, the network 602 supports actual routing of communications based upon control provided by the network spanning call center controller 600.

The particular embodiments disclosed herein are susceptible to various modifications and alternative forms. For example, while the above systems were described with respect to particular call scenarios, it should be noted that the network spanning call center handles multiple calls to various sets of selected agent terminals. In addition, the network spanning call center could provide a service offering that is shared by various different service providers. In this business model, each service client or equipment operator would provide service for selected calls identified for such service client and could designate particular agent terminals on a client basis. Billing records could then be created based on a particular client's use.

Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A network spanning heterogeneous call center controller comprising:
   a public switched telephone network input;
   an internet connection input;
   a switching element responsive to the public switched telephone network input;
   an internet protocol interface responsive to the internet connection input;
   a telephony resource module connectable to the switching element;
   a processor coupled to a data bus, the data bus coupled to the internet protocol interface and the switching element;
   a first set of agent output channels responsive to the switching element, the first set of agent output channels directed to communicate with circuit switched agent terminals;
   a second set of agent output channels responsive to the internet protocol interface, the second set of agent output channels directed to communicate with internet enabled agent terminals; and
   a domain conversion module coupled to the switching element and the internet protocol interface, the domain conversion module to convert between the internet protocol traffic and the circuit switched voice traffic, the domain conversion module responsive to the internet protocol interface.

2. The network spanning heterogeneous call center controller of claim 1, further comprising a data resources module to provide selected data resources via the internet protocol interface.

3. A network spanning heterogeneous call center controller comprising:
   an internet connection input;
   a switching element responsive to a public switched telephone network input;
   an internet protocol interface responsive to an internet connection input;
   a processor coupled to a data bus, the data bus coupled to the internet protocol interface and the switching element;

a first set of agent output channels responsive to the switching element, the first set of agent output channels directed to communicate with circuit switched agent terminals;

a second set of agent output channels responsive to the internet protocol interface, the second set of agent output channels directed to communicate with internet enabled agent terminals; and a domain conversion module coupled to the switching element and the internet protocol interface to convert internet protocol traffic and circuit switched voice traffic on an inter-domain basis between the first set of agent output channels and the second set of agent output channels.

4. The network spanning heterogeneous call center controller of claim 3 further comprising:

a data resource module coupled to the internet protocol interface to provide selected data resources.

5. The network spanning heterogeneous call center controller of claim 4 wherein the selected data resources include at least one of:

a web page support function, a caller interface generation function, and an email services function.

6. The network spanning heterogeneous call center controller of claim 4 further comprising:

a telephony resource module coupled to the switching module to provide selected telephony resources.

7. The network spanning heterogeneous call center controller of claim 6 wherein the selected telephony resources include at least one of:

a music-on-hold resource, a voice mail resource, an interactive voice response function, and a speech recognition function.

8. A network spanning heterogeneous call center controller comprising:

processing circuitry;

an internet protocol (IP) interface operably coupled to the processing circuitry that supports data transmission with an IP network for receiving data traffic;

a switching element operably coupled to the processing circuitry that supports data transmission with a public switched telephone network (PSTN) network for receiving voice traffic;

a domain conversion module operably coupled to the IP interface and the switching element that supports conversion of voice traffic between a PSTN network domain and an IP network domain; and memory operably coupled to the processing circuitry, wherein the memory stores operational instructions that cause the processing circuitry to:

when an IP-enabled agent of a plurality of IP-enabled agents is unavailable, present the data traffic to the domain conversion module to route the data traffic through the switching element to a first set of agent output channels responsive to the switching element; and when an agent telephone unit of a plurality of agent telephone units is unavailable, present the voice traffic to the domain conversion module to route the voice traffic through the IP interface to a second set of agent output channels responsive to the internet protocol interface.

9. The network spanning heterogeneous call center controller of claim 8 further comprising:

a data resource module to provide selected data resources via the internet protocol interface.

10. The network spanning heterogeneous call center controller of claim 9 wherein the selected data resources include at least one of:

a web page support function, a caller interface generation function, and an email services function.

11. The network spanning heterogeneous call center controller of claim 8 further comprising:

a telephone data resource module to provide selected telephony resources via the switching module.

12. The network spanning heterogeneous call center controller of claim 11 wherein the selected telephony resources include at least one of:

a music-on-hold resource, a voice mail resource, an interactive voice response function, and a speech recognition function.

* * * * *